(12) United States Patent
Jeon

(10) Patent No.: US 11,334,659 B2
(45) Date of Patent: May 17, 2022

(54) METHOD OF RELEASING SECURITY USING SPATIAL INFORMATION ASSOCIATED WITH ROBOT AND ROBOT THEREOF

(71) Applicant: LG ELECTRONICS INC., Seoul (KR)

(72) Inventor: Chanyong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 16/583,633

(22) Filed: Sep. 26, 2019

(65) Prior Publication Data

US 2020/0026845 A1    Jan. 23, 2020

(30) Foreign Application Priority Data

Aug. 26, 2019 (KR) ........................ 10-2019-0104404

(51) Int. Cl.

| | |
|---|---|
| *G06F 21/00* | (2013.01) |
| *G06F 21/44* | (2013.01) |
| *G06F 21/45* | (2013.01) |
| *G06T 7/521* | (2017.01) |
| *G06T 7/73* | (2017.01) |
| *G06F 21/36* | (2013.01) |
| *G06K 9/00* | (2022.01) |

(52) U.S. Cl.
CPC .............. *G06F 21/44* (2013.01); *G06F 21/36* (2013.01); *G06F 21/45* (2013.01); *G06K 9/00771* (2013.01); *G06T 7/521* (2017.01); *G06T 7/73* (2017.01)

(58) Field of Classification Search
CPC .......... G06F 21/44; G06F 21/36; G06F 21/45; G06T 7/521; G06K 9/00771
See application file for complete search history.

(56) References Cited

U.S. PATENT DOCUMENTS

| | | | |
|---|---|---|---|
| 2014/0254896 A1* | 9/2014 | Zhou .......................... | B25J 9/16 382/124 |
| 2016/0033966 A1* | 2/2016 | Farris .................... | A47G 29/141 701/15 |
| 2019/0102730 A1* | 4/2019 | Giorgi ...................... | B64D 1/22 |

* cited by examiner

Primary Examiner — Edward Zee
(74) Attorney, Agent, or Firm — KED & Associates LLP

(57) ABSTRACT

Provided is a method of releasing security using spatial information associated with a robot, the method including capturing the robot using a camera of a security device, acquiring first release information including at least one of security release information and the spatial information based on an image acquired by capturing the robot, comparing the first release information to predetermined second release information, and determining to release the security when the first release information matches the second release information, wherein the spatial information is information on a position of the robot in which a security release function is executed. In addition, a security device operating based on a security releasing method and a non-transitory computer readable recording medium including a computer program for performing the security releasing method are provided.

20 Claims, 13 Drawing Sheets

METHOD OF RELEASING SECURITY USING SPATIAL INFORMATION ASSOCIATED WITH ROBOT AND ROBOT THEREOF

CROSS-REFERENCE TO RELATED APPLICATION

This application claims the benefit of Korean Patent Application No. 10-2019-0104404, filed on Aug. 26, 2019, in the Korean Intellectual Property Office, the disclosure of which is incorporated herein in its entirety by reference.

BACKGROUND

1. Field

The present disclosure relates to a method and device for releasing security using spatial information acquired through a camera.

2. Description of the Related Art

At present, various types of electronic devices are used widely. In the electronic devices, cameras may be included to acquire peripheral information. In addition to being used for the interest of users, the cameras in the electronic devices may implement a security release or maintenance function using a captured image. For example, in order to release or maintain security, a user may input a password to the electronic device directly, or use a function such as face recognition, iris recognition, gesture recognition, and the like performed through the camera of the electronic device.

SUMMARY

In order to solve a vulnerability of security caused by user's biometric information itself or a password for releasing the security, the present disclosure is to enhance the security by analyzing a space related to an image captured by a camera and releasing the security based on a result of the analyzing.

According to an aspect, there is provided a method of releasing security using spatial information associated with a robot, the method including capturing the robot using a camera of the security device, acquiring first release information including at least one of security release information and the spatial information based on an image acquired by capturing the robot, comparing the first release information to predetermined second release information, and determining to release the security when the first release information matches the second release information, wherein the spatial information is information on a position of the robot in which a security release function is executed.

According to another aspect, there is also provided a security device for releasing security using spatial information associated with a robot, the device including a camera configured to capture the robot, and a processor configured to acquire first release information including security release information and the spatial information based on an image acquired by capturing the robot, compare the first release information to predetermined second release information, and determine to release the security when the first release information matches the second release information, wherein the spatial information is information on a position of the robot in which a security release function is executed.

According to still another aspect, there is also provided a non-transitory computer-readable storage medium including programs to execute a security releasing method.

According to example embodiments, it is possible to acquire, using a camera, information obtained by combining security release information with spatial information in various environments requiring security such as an environment in which a user terminal, a door, a safe, an unmanned delivery box, a household appliance, and an automobile are used and use the acquired information for security release, so as to implement a more enhanced security function.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
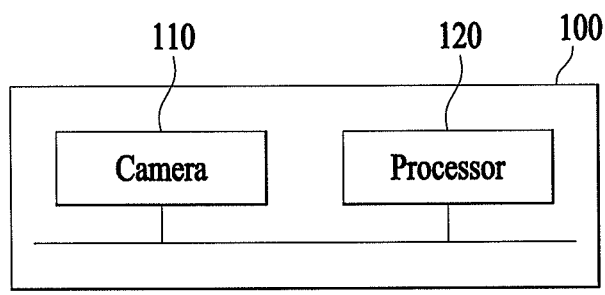
FIG. 1 is a block diagram illustrating a security device according to an example embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the drawings so that those skilled in the art can easily carry out the present disclosure. The present disclosure may be embodied in many different forms and is not limited to the embodiments described herein.

With respect to constituent elements used in the following description, suffixes "module" and "unit" are given or mingled with each other only in consideration of ease in the preparation of the specification, and do not have or serve as different meanings.

In order to clearly describe the present disclosure, elements having no connection with the description are omitted, and the same or extremely similar elements are designated by the same reference numerals throughout the specification. In addition, some embodiments of the present disclosure will be described in detail with reference to exemplary drawings. When adding reference numerals to constituent elements of the respective drawings, it should be noted that the same or similar elements are denoted by the same reference numerals even though they are depicted in different drawings. In addition, in the following description of the present disclosure, a detailed description of known functions and configurations incorporated herein will be omitted when it may make the subject matter of the present disclosure rather unclear.

In addition, it will be understood that the terms first, second, A, B, (a), and (b), for example, may be used herein to describe various elements according to the embodiments of the present disclosure. These terms are only used to distinguish one element from another element and, thus, are not intended to limit the essence, order, sequence, or number of elements. It will be understood that, when any element is referred to as being "connected to" "coupled to", or "joined to" another element, it may be directly on, connected to or coupled to the other element or intervening elements may be present.

It will be further understood that the terms "comprises" "comprising" "includes" and/or "including" when used in this specification, specify the presence of stated features, integers, steps, operations, elements, and/or components, but do not preclude the presence or addition of one or more other features, integers, steps, operations, elements, and/or components.

In addition, for convenience of description, the present disclosure may be embodied by subdividing constituent elements, but these constituent elements may be embodied in a single device or module, or one constituent element may be divided into multiple devices or modules.

Prior to describing various embodiments of the present disclosure, key terms will be described as follows.

The term "security device" refers to a device that may determine, when information is input in a security-maintained state, whether the input information satisfies a predetermined condition and release security such that a user is allowed to use a function restricted by the security. The security device may release security using various types of input information such as a password, a gesture, a pin code, and the like, for example. The security device may include various electronic devices including a camera and a processor in which information is processed. The security device, for example, a user terminal, a computer, a door, a refrigerator, and a safe may be embodied as examples of the present disclosure.

The term "spatial information" refers to information on an object captured by a camera. The spatial information may include spatial information of the object in a two-dimensional (2D) image acquired by the camera or spatial information of the object in a three-dimensional (3D) image. The security device may acquire spatial information including information associated with a distance from the camera to the object as well as a position on a plane in parallel with a sensor, for example, a charge-coupled device (CCD) sensor and a complementary metal oxide semiconductor (CMOS) sensor of the camera. When the camera captures a 2D plane image, spatial information may include information on a distance from an object calculated based on a size of the object and a position of the object on a 2D plane. When the camera captures a 3D image, spatial information may include information on a position of the object in a 3D space. The spatial information may include information on various positions of the object, and may be understood as including information on a moving direction to various positions.

The term "security release information" refers to information used for releasing security. According to an example embodiment of the present disclosure, security release information and spatial information may be included in first release information. The security may be released when the first release information fully matches second release information. The security release information may include at least one selected from a group consisting of various types of input information (for example, information indicating a password, a pin code, a gesture, or a stop time after movement), excluding the spatial information, among items of information to be input to release the security.

The "first release information" may include input information for security release. The input information may be acquired from an image obtained by a camera of a security device. The security device may determine whether the first release information matches predetermined "second release information" which is information required to be input for the security release, so as to release the security.

The "security release" may include various process of releasing a security function that blocks an access of the user to predetermined information or function so that a user is to use the corresponding information or function. For example, when the security device is a user terminal, the user may access a function of the terminal through the security release. When the security device is a door, the user may pass the door through the security release. In addition, such security release function may be understood to correspond to a security function implemented through various security devices.

The term "artificial Intelligence (A.I.)" refers to the field of studying artificial intelligence or a methodology capable of making the artificial intelligence, and the term "machine learning" refers to the field of studying methodologies that define and solve various problems handled in the field of artificial intelligence. The machine learning is also defined as an algorithm that enhances performance for a certain operation through a steady experience with respect to the operation.

The term "artificial neural network (ANN)" may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The artificial intelligence may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

The term "autonomous driving (or self-driving)" refers to a technology in which a vehicle drives autonomously, and the term "autonomous vehicle" refers to a vehicle that travels without a user's operation or with a user's minimum operation.

For example, autonomous driving may include all of the technology of maintaining the lane in which a vehicle is driving, the technology of automatically adjusting a vehicle speed such as adaptive cruise control, the technology of causing a vehicle to automatically drive along a given route, and the technology of automatically setting a route, along which a vehicle drives, when a destination is set.

The vehicle may include all of a vehicle having only an internal combustion engine, a hybrid vehicle having both an internal combustion engine and an electric motor, and an electric vehicle having only an electric motor, and may include not only an automobile but also a train and a motorcycle, for example.

At this time, the autonomous vehicle may be seen as a robot having an autonomous driving function.

The term "extended reality" (XR) is a generic term for virtual reality (VR), augmented reality (AR), and mixed reality (MR). The VR technology provides only a CG image of a real-world object or background, for example, the AR technology provides a virtual CG image over an actual object image, and the MR technology is a computer graphic technology of providing an image obtained by mixing and combining virtual objects with the real world.

The MR technology is similar to the AR technology in that it shows a real object and a virtual object together. However, the virtual object is used to complement the real object in the AR technology, whereas the virtual object and the real object are equally used in the MR technology.

The XR technology may be applied to a head-mounted display (HMD), a head-up display (HUD), a mobile phone, a tablet PC, a laptop computer, a desktop computer, a TV, and a digital signage, for example, and a device to which the XR technology is applied may be referred to as an XR device.

Hereinafter, example embodiments of the present disclosure will be described with reference to the drawings.

FIG. 1 is a block diagram illustrating a security device 100 according to an example embodiment. The security device 100 may include a camera 110 and a processor 120. The camera 110 may capture a predetermined object, for example, a robot and a user moving along with the robot. The processor 120 may acquire first release information including at least one of security release information and spatial information based on an image acquired from the camera 110, compare the first release information to predetermined second release information, and determine to release security when the first release information matches the second release information. The spatial information may include information on a position of a robot in which a security release function is executed. Functions to be implemented by the security device 100 of FIG. 1 will be described in detail based on the following examples.

Figure 2:
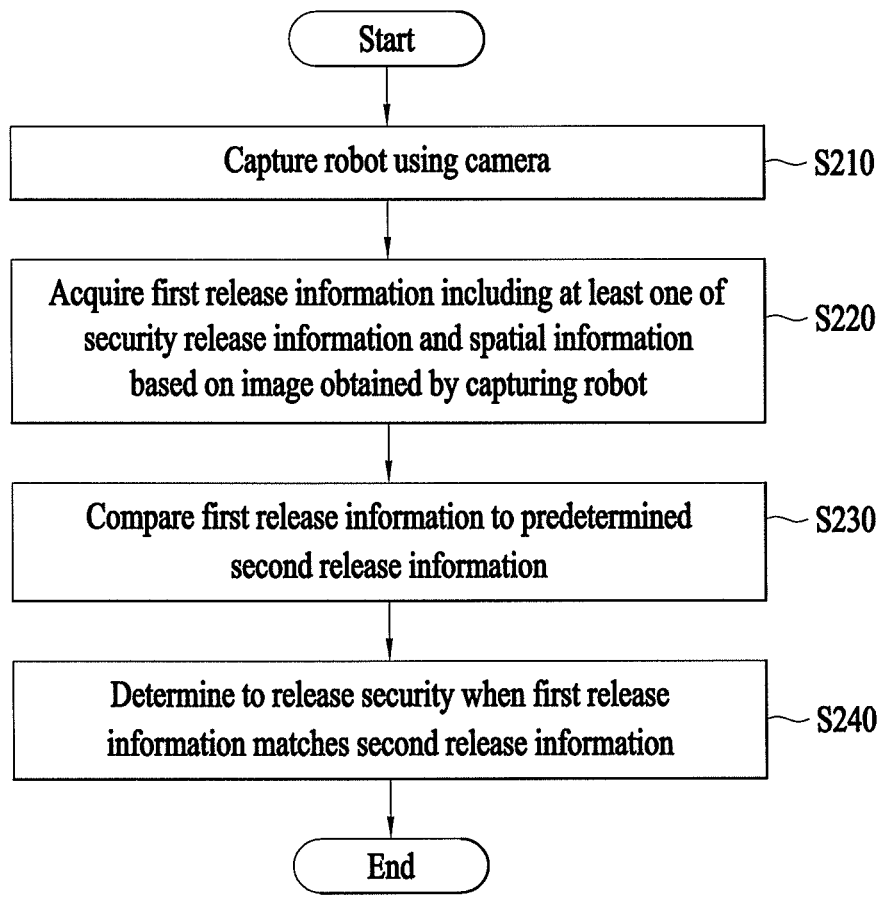
FIG. 2 is a flowchart illustrating a security releasing method performed by a security device according to an example embodiment.

FIG. 2 is a flowchart illustrating a security releasing method performed by the security device 100 according to an example embodiment.

In operation S210, the security device 100 may capture a robot using the camera 110. The robot captured by the camera 110 may be performing an operation for releasing security. The processor 120 may control the camera 110 to initiate capturing based on predetermined information acquired from an external source before the capturing is initiated. The information for initiating the capturing may be, for example, information input by a user, information received from a robot, and information received from an external system interworking with a security device.

The security device 100 may use the camera 110 to capture an operation implemented by the robot. Such capturing process may be performed by capturing spatial information associated with a position of the robot performing the operation and security release information associated with the corresponding operation performed at the position.

In operation S220, the security device 100 may acquire first release information including at least one of security release information and spatial information based on the image obtained by capturing the robot in operation S210. To acquire the first release information, the processor 120 may recognize the robot captured in the image. Various recognition technologies may be applied to recognize a predetermined object in the image. The processor 120 may recognize a variety of robots based on a deep learning technology using an artificial neural network. The processor 120 may recognize a display part that displays security release information among elements included in the captured robot, acquire the security release information therefrom, and acquire spatial information based on information associated with a position corresponding to the display part. A process of acquiring first release information based on the image obtained through the capturing will be described later.

The processor 120 may determine spatial information based on the image acquired through the capturing. For example, the spatial information may be information indicating a position at which the robot corresponding to the object is located based on the camera 110. Here, the information may be information corresponding to a distance from the camera 110. The processor 120 may determine 3D image information acquired through the camera 110 to be the spatial information. Also, the processor 120 may determine information on a distance from the robot obtained by image-processing 2D image information acquired through the camera 110, to be the spatial information.

In operation S230, the security device 100 may compare the first release information to predetermined second release information. The second release information for releasing the security may be determined by the processor 120 of the security device 100 in advance. Also, the second release information may be set by a user in advance and acquired from an external source. A process in which the processor 120 compares the first release information to the second release information may be a process of comparing security release information and spatial information included in the first release information to security release information and spatial information included in the second release information, respectively.

Spatial information included in the first release information or the second release information may be at least one item of information. For example, security release information and spatial information included in the first release information may be associated with each other. In this example, when comparing the first release information to the second release information, the security device 100 may verify whether the security release information associated with the spatial information in the first release information matches security release information associated with spatial information in the second release information.

In operation S240, when the first release information matches the second release information, the security device 100 may determine to release security. When the security release information included in the first release information matches corresponding security release information included in the second release information, and when the spatial information included in the first release information matches corresponding spatial information included in the second release information, the security device 100 may determine to release the security.

Figure 3:
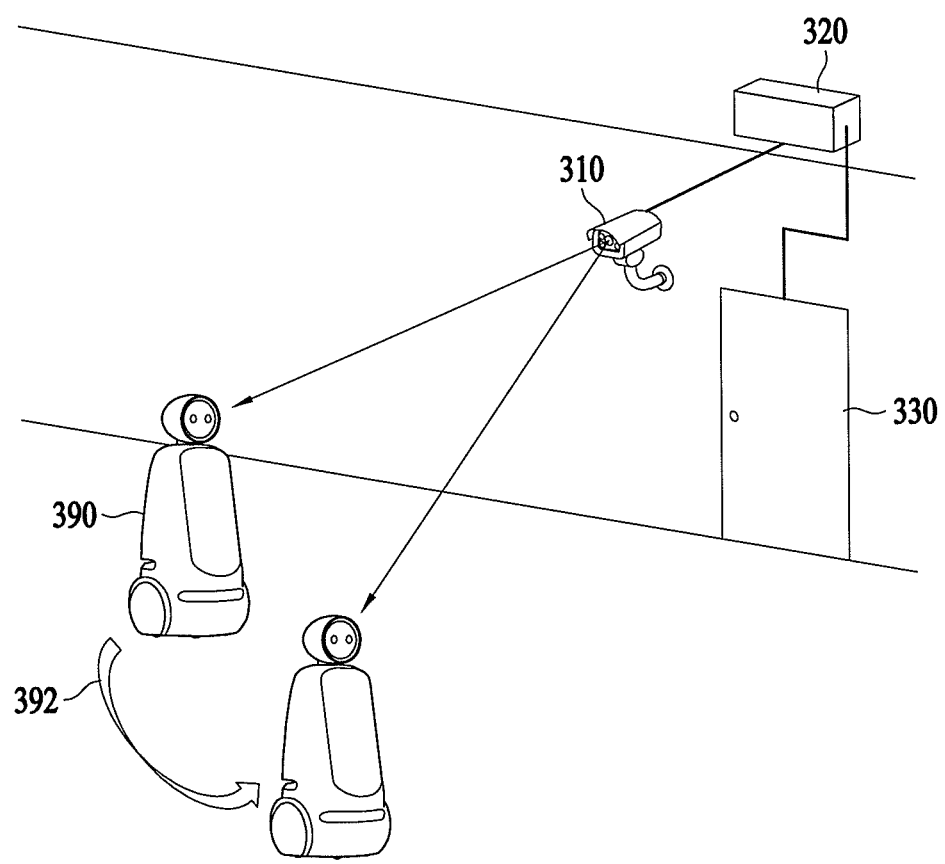
FIG. 3 illustrates a process of releasing security using spatial information to be acquired by a security device through an operation of a robot according to an example embodiment.

FIG. 3 illustrates a process of releasing security using spatial information to be acquired by the security device 100 through an operation of a robot 390 according to an example embodiment.

The security device 100 may capture the robot 390 using a camera 310. A processor 320 may acquire first release information based on an image obtained by capturing the robot 390. The security device 100 may be wired or wirelessly connected to a separate device that may operate when security is released through the camera 310 and the processor 320. The separate device may be, for example, a door 330 that allows an entry when the security is released.

The security device 100 may receive predetermined information to initiate capturing of the robot 390 using the camera 310. For example, the capturing of the security device 100 may be initiated based on an external input from the robot 390 or a user moving along with the robot 390. Also, the capturing of the security device 100 may be initiated based on a capturing initiation command received from a security system (not shown) interworking with the security device 100.

The robot 390 may perform an operation for representing the first release information, starting from a point in time at which the camera 310 of the security device 100 is initiated to capture the robot 390. The operation of the robot 390 may include, for example, an operation of moving within a field of view (FOV) of the camera 310, an operation of displaying predetermined information on a display of the robot 390, and an operation of physically expressing a predetermined gesture using a driver of the robot 390.

The camera 310 may capture the robot 390 to acquire security release information including predetermined information such as a password, a pin code, and the like displayed on the display of the robot 390. The robot 390 may operate based on the first release information which is information in which a process of displaying the security release information is combined with a moving process 392. For example, the robot 390 may operate based on security release information associated with each items of spatial information such that a different item of information is displayed at each position. Table 1 shows combinations of operations performed by the robot 390 to display security release information associated with each items of spatial information, for example.

TABLE 1

|  | Spatial information | |
|---|---|---|
|  | P1 | P2 |
| Security release information | A1 | A2 |

As shown in Table 1, the robot 390 may move to a position corresponding to spatial information P1, display security release information A1, move to a position corresponding to spatial information P2, for example, through the moving process 392, and then display security release information A2. The camera 310 may capture such operation of the robot 390, thereby acquiring first release information including the security release information A1 associated with the spatial information P1 and the security release information A2 associated with the spatial information P2. The description of Table 1 is made to explain that the security release information and the spatial information are associated with each other and thus, the security release information and the spatial information should not be interpreted as being limited thereto. For example, the robot 390 may move to at least one position. Also, security release information to be displayed at such position may vary for each position. Therefore, it should be understood that various techniques to be implemented by those skilled in the art are included within the scope for implementing the characteristic of the camera 310 capturing the operation of the robot 390 and acquiring the first release information associated with the spatial information.

Figure 4:
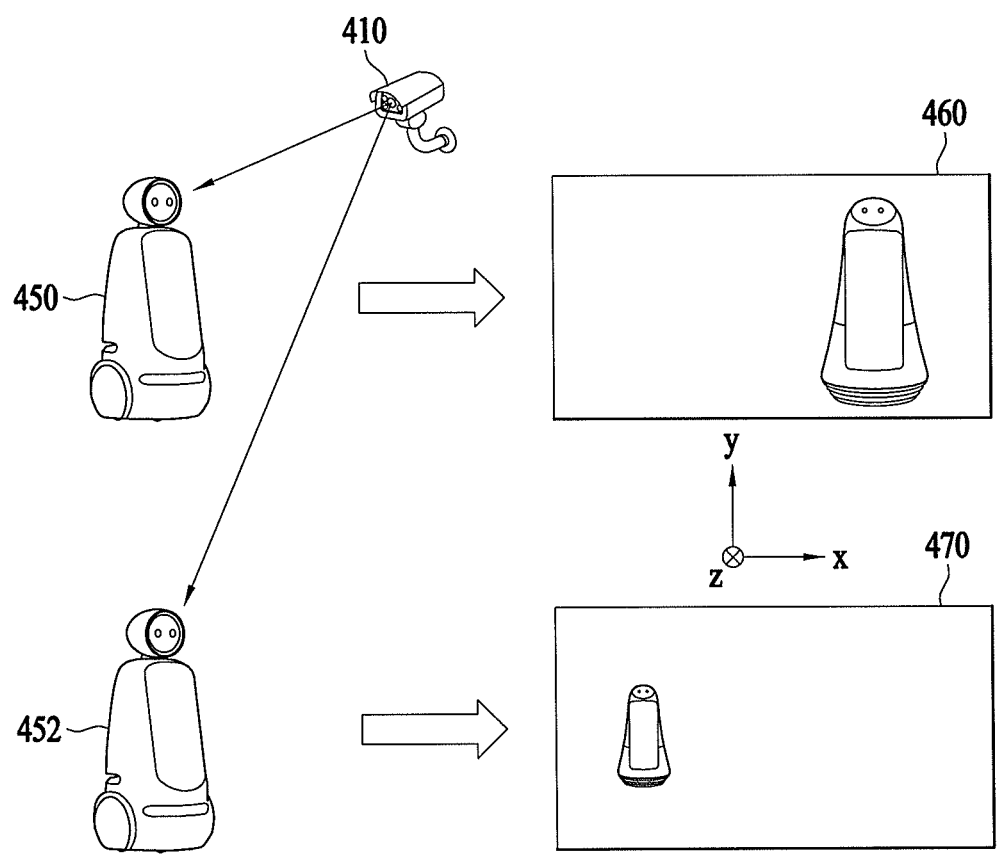
FIG. 4 illustrates a process of acquiring spatial information from an image obtained by a camera capturing a robot according to an example embodiment.

FIG. 4 illustrates a process of acquiring spatial information from an image obtained by a camera 410 capturing a robot 450 according to an example embodiment.

The camera 410 may include various types of cameras for capturing a plane image. The security device 100 may acquire spatial information using the camera 410 being widely used.

Referring to FIG. 4, the camera 410 may acquire a first image 460 by capturing the robot 450 located at a first position. The robot 450 at the first position may be displayed at a predetermined position in the first image 460. The camera 410 may acquire a second image 470 by capturing a robot 452 located at a second position. The robot 452 at the second position may be displayed at a predetermined position in the second image 470. Here, a distance from the first position to the camera 410 may be less than a distance from the second position to the camera 410. Also, the robot 452 may be displayed in a size smaller than that of the robot 450 at the first position. The processor 120 may acquire spatial information based on the sizes of the robots 450 and 452 displayed in the first image 460 and the second image 470 acquired by capturing the robot 450 at the first position and the robot 452 at the second position.

Spatial information included in first release information and second release information may be represented in a form of a moving direction of a robot in addition to coordinate information. When the spatial information is used in the form of coordinate information, the spatial information may indicate coordinates such as (x1, y1, z1), (x2, y2, z2), and the like. When the spatial information is used as the moving direction of a robot, the spatial information may indicate a direction in which the robot moves from a reference point in a 3D space. The spatial information may be defined as information such as a movement in a direction to (x1, y1, z1) and a movement in a direction to (x2, y2, z2) based on the reference point.

When the camera 410 is a camera that captures a plane image, a first processor, for example, the processor 120 may calculate spatial information by determining a direction in which the robot moves based on a position of the robot in a previous image. The spatial information may be a moving direction of a robot represented by vector coordinates (x, y, z) in which a coordinate x represents a left/right direction, a coordinate y represents an up/down direction, and a coordinate z represents a forward/back direction.

As an example, referring to FIG. 4, the processor 120 may determine, to be a reference point, the first position at which the robot 450 is located at a point in time that the camera 410 initiates capturing. Thereafter, when the camera 410 captures the robot 450 moving to the second position, for example, the position of the robot 452 of FIG. 4, the processor 120 may determine that spatial information indicates a movement performed in a leftward and backward direction at the same height, for example, a movement in a (−1, 0, 1) vector direction according to an operation of the robot 450.

As another example, referring to FIG. 4, the processor 120 may determine, to be a reference point, the second position at which the robot 452 is located at a point in time that the camera 410 initiate capturing. Thereafter, when the camera 410 captures the robot 452 moving to the first position, for example, the position of the robot 450 of FIG. 4, the processor 120 may determine that spatial information indicates a movement performed in a rightward and forward direction at the same height, for example, a movement in a (1, 0, −1) vector direction according to an operation of the robot 452.

The foregoing example are merely described to explain a method in which the processor 120 acquires spatial information using a captured plane image and thus, characteristics of the processor 120 should not be interpreted as being limited thereto. Instead, it should be understood that various example embodiments may be implemented within the scope to use, for calculating spatial information, information on a moving direction of an object which can be interpreted through a plane image.

The camera 410 may include a depth information acquirer to acquire 3D information or depth information. The depth information acquirer may include various types of cameras. The security device 100 may use various types of depth cameras for acquiring depth information, for example, a TrueDepth camera, a Time of Flight (ToF) camera, a radar, and a lidar, as the depth information acquirer in addition to a 3D camera capable of capturing a 3D image. The camera 410 may also use a combination of a camera capable of capturing a 2D image and the depth information acquirer that acquires depth information.

Figure 5:
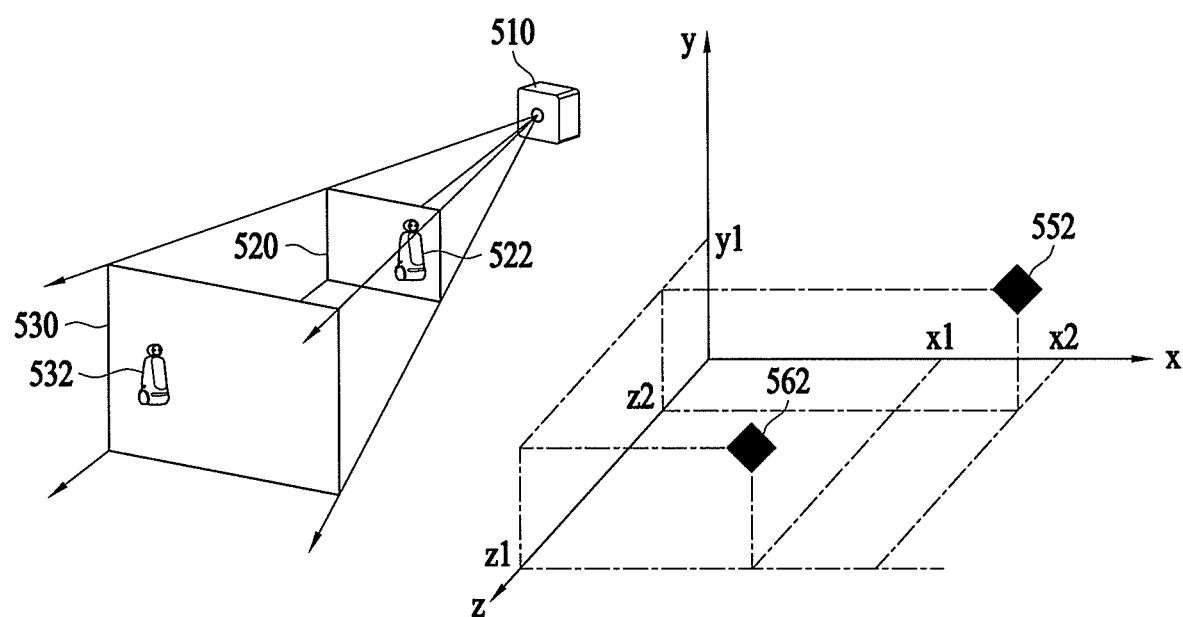
FIG. 5 illustrates a process of acquiring spatial information from an image of a robot using a depth information acquirer according to an example embodiment.

FIG. 5 illustrates a process of acquiring spatial information from images obtained by capturing robots 522 and 532 using a depth information acquirer 510 according to an example embodiment.

The security device 100 may use the depth information acquirer 510 to acquire depth information in addition to information on a position of an object on a plane. The processor 120 may determine distances from the robots 522 and 532 to the depth information acquirer 510 based on the depth information and determine spatial information based on the distances.

Referring to FIG. 5, the security device 100 may acquire position information of the robot 522 located at a first position based on a first image 520 obtained by capturing the robot 522 at the first position using the depth information acquirer 510. Also, the security device 100 may additionally acquire depth information indicating a distance corresponding to such position. The security device 100 may acquire position information of the robot 532 located at a second position based on a second image 530 obtained by capturing the robot 532 at the second position using the depth information acquirer 510. Here, a distance from the depth information acquirer 510 to the second position may be greater than a distance from the depth information acquirer 510 to the first position. Also, the security device 100 may additionally acquire depth information indicating a distance corresponding to such position. In this case, depth information of the robot 522 at the first position may indicate a less distance from the depth information acquirer 510 when compared to the depth information of the robot 532 at the second position. As illustrated in FIG. 5, distance information 552 corresponding to the first position may indicate (x2, y1, z2) and distance information 562 corresponding to the second position may indicate (x1, y1, z1). The security device 100 performing the capturing using the depth information acquirer 510 may use depth information expressed in a form of coordinates, as spatial information. The security device 100 acquiring information using the depth information acquirer 510 may calculate a moving direction of a robot based on the depth information and determine the spatial information based on the moving direction. Since the scheme of applying the spatial information associated with the moving direction of the robot is described above, repeated description will be omitted.

Figure 6:
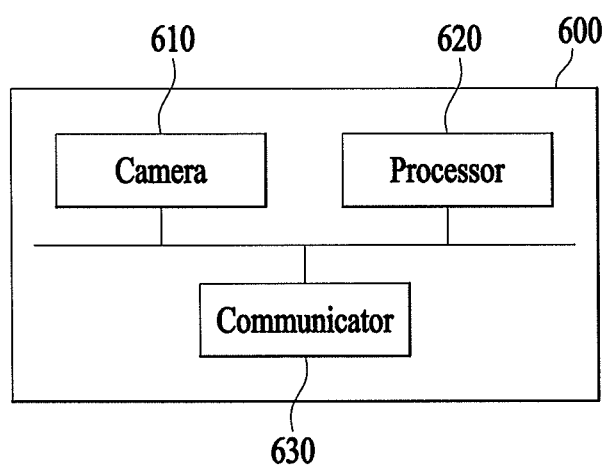
FIG. 6 is a block diagram illustrating a security device including a communicator according to an example embodiment.

FIG. 6 is a block diagram illustrating a security device 600 including a communicator 630 according to an example embodiment. Since the security device 600 of FIG. 6 is embodied by adding the communicator 630 capable of implementing additional features to the features of the security device 100 of FIG. 1, the features of the security device 100 of FIG. 1 are also applicable thereto. A processor 620 may control the communicator 630 such that the security device 100 wired or wirelessly communicates with an external electronic device, for example, a robot performing a security releasing operation, a security system organically connected to the security device 600, and a user terminal. According to an embodiment, the communicator 630 may include a hardware component such as a transceiver, a communication interface, etc.

Figure 7:
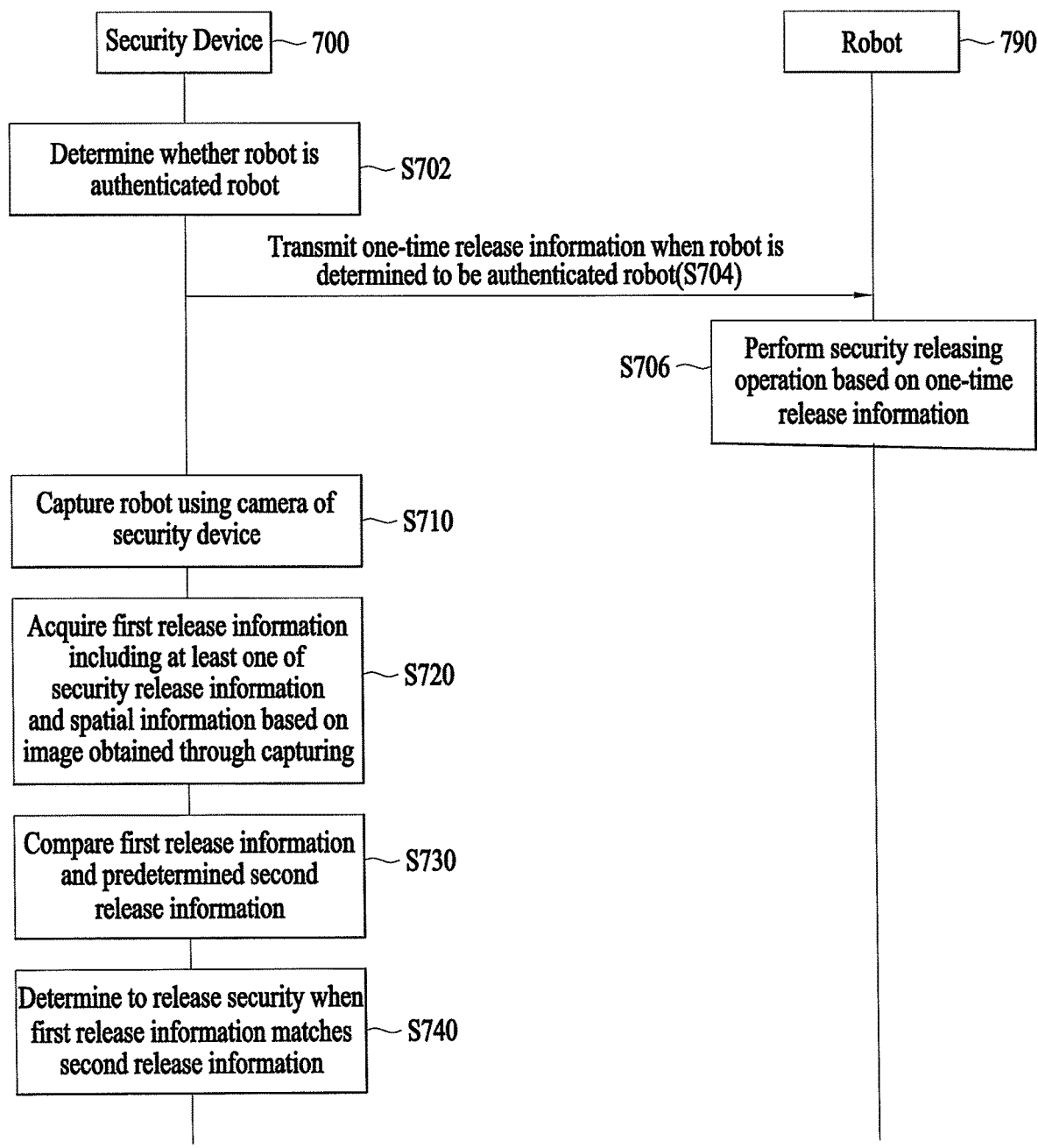
FIG. 7 is a flowchart illustrating a method of releasing security by capturing a robot operating based on one-time release information according to an example embodiment.

FIG. 7 is a flowchart illustrating a method of releasing security by capturing a robot 790 operating based on one-time release information according to an example embodiment.

In operation S702, a security device 700 may determine whether the robot 790 is a robot authenticated to release security. The processor 620 may determine whether the robot 790 is an authenticated robot based on information received from an external source through the communicator 630. For example, the security device 700 may receive authentication information from a security system interworking with the security device 700 to determine that the robot 790 is the authenticated robot. Alternatively, the security device 700 may receive authentication information received through a user terminal and verify that the robot 790 is a robot authenticated by a user or a robot possessed by the user so as to determine that the robot 790 is the authenticated robot.

The security device 700 may determine that the robot 790 is the authenticated robot based on a received robot identification number. The security device 700 may verify information, for example, a quick response (QR) code, a barcode, and a serial number attached to the robot 790 using the camera 610, compare the verified information to the robot identification number received through the communicator 630, and determine that the robot 790 is the authenticated robot.

In operation S704, when the robot 790 is determined to be the authenticated robot in operation S702, the security device 700 may control the communicator 630 to transmit one-time release information to the robot 790. The one-time release information may be temporarily stored as second release information of the security device 700 and compared to first release information acquired through an operation of the robot 790.

In operation S706, the robot 790 may perform a security releasing operation based on the one-time release information. The security device 700 may capture the security releasing operation of the robot 790 using the camera 610 in operation S710.

In operation S720, the security device 700 may acquire first release information including at least one of security release information and spatial information based on an image obtained through the capturing in operation S710. The first release information acquired by the security device 700 may correspond to the one-time release information transmitted to the robot 790.

In operation S730, the security device 700 may compare the first release information and predetermined second release information. Since the security device 700 verifies that the robot 790 is the authenticated robot and transmits the one-time release information, the first release information acquired from the image obtained by capturing the operation of the robot 790 and the second release information known by the security device 700 may correspond to the one-time release information.

In operation S740, when the first release information matches the second release information, the security device 700 may determine to release security.

Figure 8:
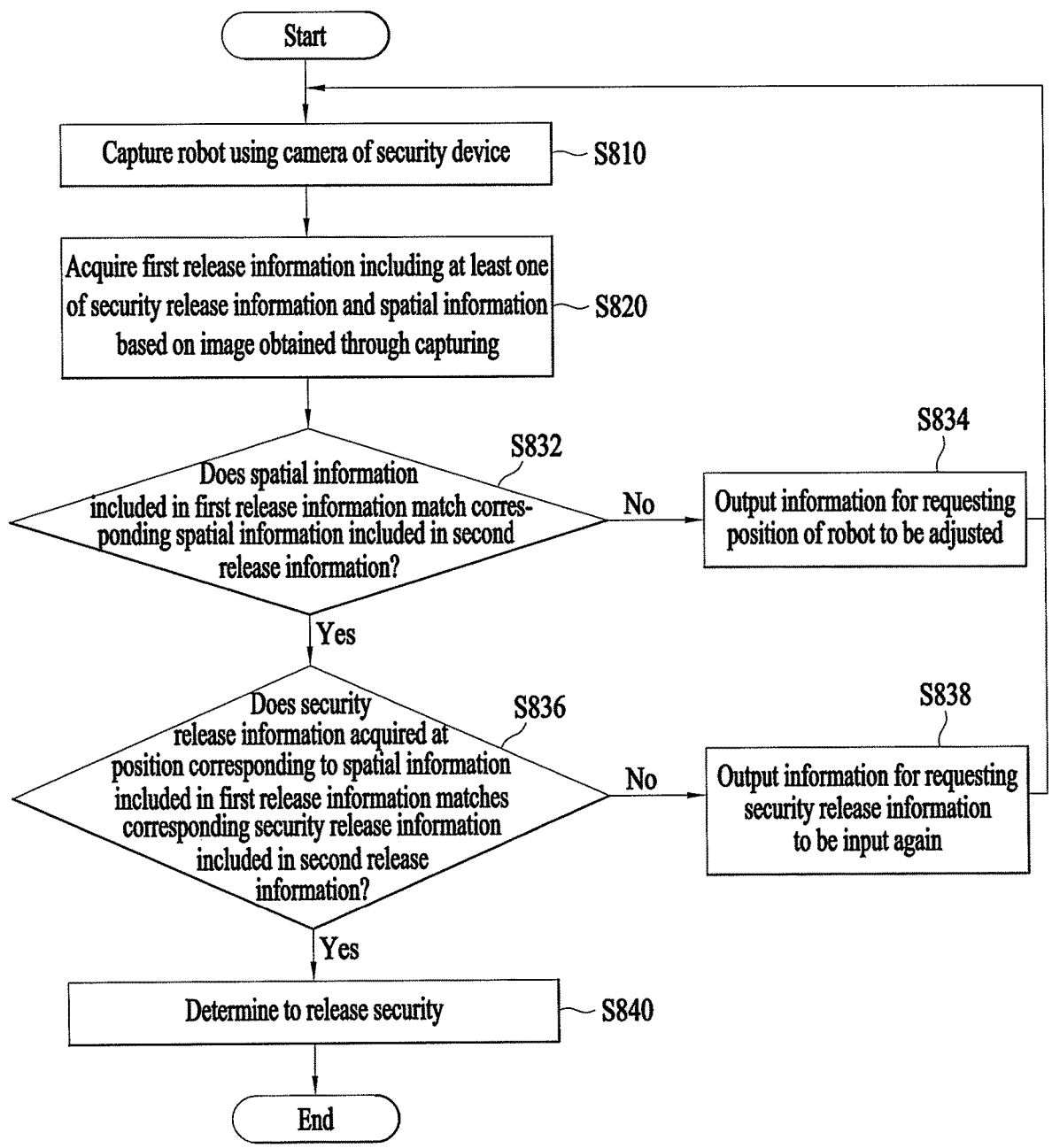
FIG. 8 is a flowchart illustrating a process of releasing security based on whether spatial information and security release information are matched according to an example embodiment.

FIG. 8 is a flowchart illustrating a process of releasing security based on whether spatial information and security release information are matched. When security release information and spatial information included in first release information do not match corresponding security release information and corresponding spatial information included in second release information, respectively, the security device 100 may output information for requesting an operation related to nonmatching information to be performed again. Since the features of operations S810, S820, and S840 of FIG. 8 are similar or identical to the features of S210, S220, and S240 of FIG. 2, repeated description will be omitted.

In operation S832, the security device 100 may determine whether the spatial information included in the first release information matches the corresponding spatial information included in the second release information. When the spatial information included in the first release information does not match the corresponding spatial information included in the second release information, in operation S834, the security device 100 may generate information for requesting a position of a robot to be adjusted and output the information. The security device 100 may return to operation S810 and capture the robot again.

When the spatial information included in the first release information matches the corresponding spatial information included in the second release information, in operation S836, the security device 100 may determine whether security release information acquired at a position corresponding to the spatial information included in the first release information matches the corresponding security release information included in the second release information. When the security release information acquired at the position corresponding to the spatial information included in the first release information does not match the corresponding security release information included in the second release information, in operation S838, the security device 100 may output information for requesting security release information to be input again. The security device 100 may return to operation S810 and capture the robot again.

The example of FIG. 8 is for explaining an operation of the security device 100 determining information that is to be output by the security device 100 when it is determined that either one or both of the spatial information and the security release information included in the first release information does not match the corresponding spatial information or the corresponding security release information included in the second release information. Thus, it can also be understood that the security device 100 may compare security release information to corresponding security release information, and then compare spatial information to corresponding spatial information.

In operation S834 or S838, the security device 100 may output the information for requesting the position of the robot to be adjusted or the information for requesting the security release information to be input again, in various forms. The security device 100 may output the aforementioned information in a form of, for example, image, voice, and haptic information or various combinations thereof.

The security device 100 may simultaneously determine whether the security release information and the spatial information match the corresponding security release information and the corresponding spatial information. When the security release information and the spatial information do not match the corresponding security release information and the corresponding spatial information, the security device 100 may simultaneously output the information for requesting the position of the robot to be adjusted or the information for requesting the security release information to be input again.

When spatial information for releasing security is associated with a plurality of positions, the security device 100 may determine whether the first release information matches the second release information based on a movement order of the plurality of positions corresponding to the spatial information. In this example, the security device 100 may determine whether the first release information matches the second release information based on an order in which the security release information corresponding to each item of the spatial information are captured according to an operation of the robot for security release. As such, even if the security release information and the spatial information match the corresponding security release information and the corresponding spatial information, a capturing order may also be applied to release the security, so that more enhanced security function is implemented.

Figure 9:
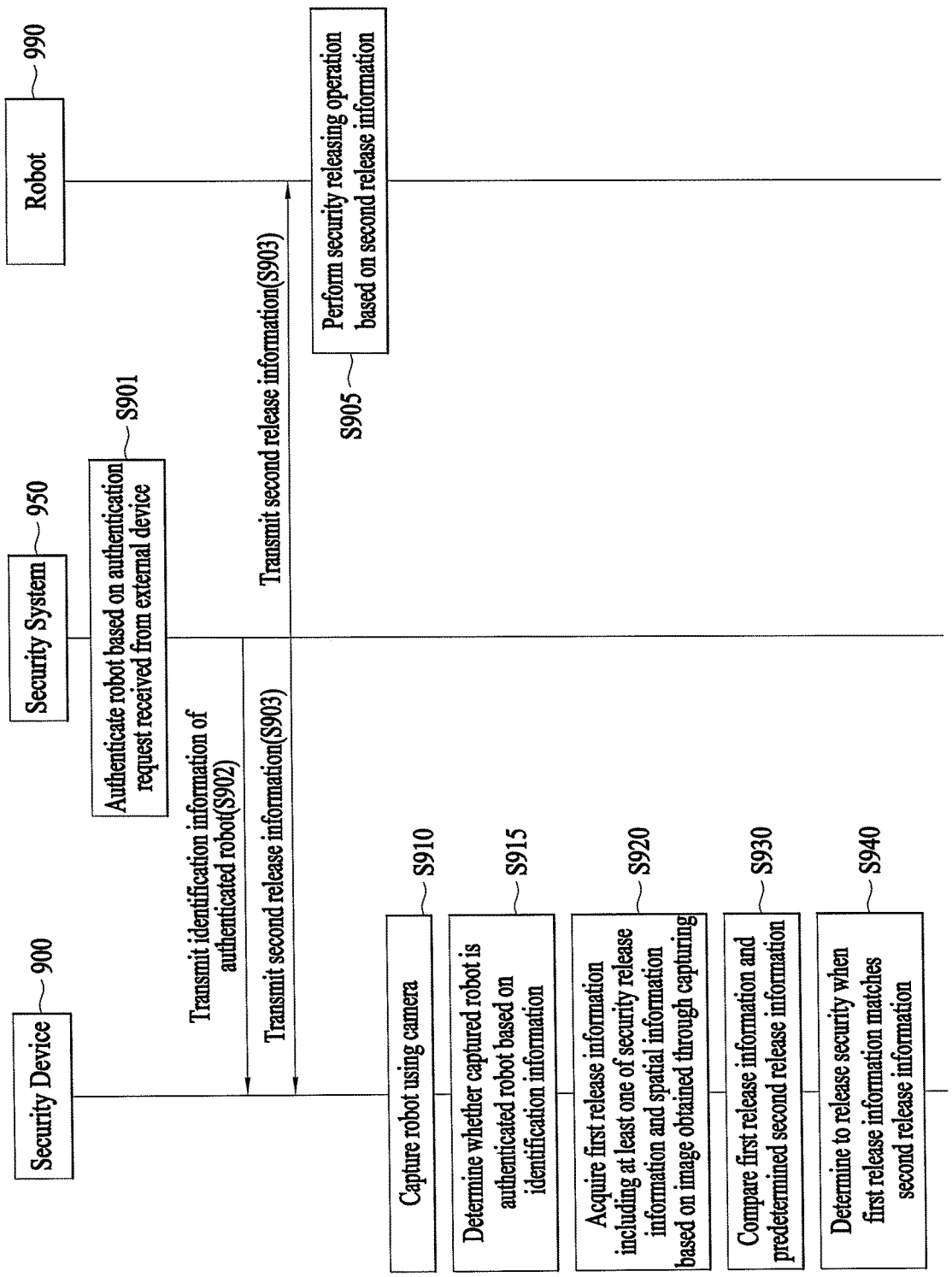
FIG. 9 is a flowchart illustrating a method to perform a security releasing method using a security device, a security system, and a robot according to an example embodiment.

FIG. 9 is a flowchart illustrating a method to perform a security releasing method using a security device 900, a security system 950, and a robot 990 according to an example embodiment. The security device 900 of FIG. 9 may correspond to the security device 600 of FIG. 6. Since the features of operations S910, S920, S930, and S940 of FIG. 9 are similar or identical to the features of operations S210, S220, S230, and S240 of FIG. 2 or the features of operations S710, S720, S730, and S740 of FIG. 7, repeated description will be omitted.

The security device 900 may interwork with the security system 950 and receive predetermined information from the security system 950. The security system 950 may be a system accessible to a user of the security device 900 and may be implemented in various forms, for example, a terminal, a server, a computer, or combinations thereof.

In operation S901, the security system 950 may determine to authenticate a robot based on an authentication request received from an external device. The security system 950 may determine whether the robot 790 is an authenticated robot based on information received from an external source. The security system 950 may receive an identification number of the robot 990 that is to perform a security releasing operation, from the robot 990 or a predetermined system interworking with the robot 990 in advance. The security system 950 may verify the identification number of the robot 990 and determine that the robot 990 is the authenticated robot. The security system 950 may determine a table for verifying whether the robot 990 is the authenticated robot. When the identification number is received from the robot 990, the security system 950 may compare the identification number to an identification number included in the table, thereby determining that the robot 990 is the authenticated robot.

The security system 950 may determine that the robot 990 is the authenticated robot based on a robot identification number received from the security device 900. The security device 900 may verify information, for example, a QR code, a barcode, and a serial number attached to the robot 990 using the camera 610 and transmit the identification information to the security system 950 through the communicator 630. The security system 950 may verify whether the identification number on the table matches the identification number received from the security device 900, thereby determining that the robot 990 is the authenticated robot.

In operation S902, the security device 900 may receive identification information of the authenticated robot from the security system 950. The security system 950 and the security device 900 may share the table determined for authenticating the robot. For example, the security device 900 may receive identification information of only a robot determined by the security system 950 to be an authenticated robot.

In operation S903, the security system 950 may transmit second release information to the security device 900. In addition, the security system 950 may transmit the second release information to the robot 990 determined to be the authenticated robot. In operation S905, the robot 990 may perform an operation for releasing security in front of the camera 610 of the security device 900 based on the second release information acquired on the premise of being authenticated.

In operation S910, the security device 900 may capture the robot 990 using the camera 610. In operation S915, the security device 900 may determine whether the captured robot 990 is an authenticated robot based on the identification information received in operation S902.

In response to the identification information of the authenticated robot being received from the security system 950 in operation S902, the security device 900 may determine that the captured robot 990 is the authenticated robot by comparing the received identification information to information associated with the robot 990, for example, the QR code, the barcode, and the serial number attached to the robot 990, the information which is acquired through the camera 610 of the security device 900.

Figure 10:
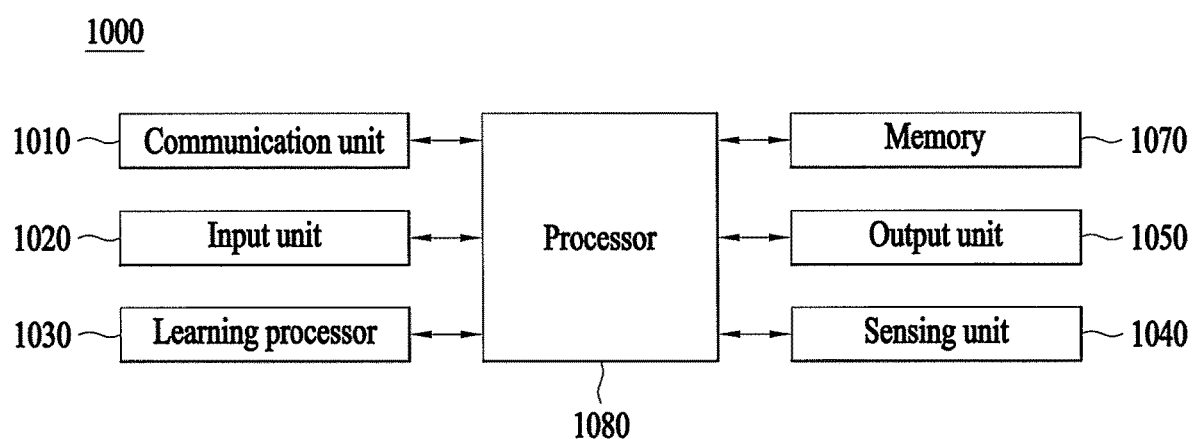
FIG. 10 illustrates an artificial intelligence (AI) device according to an example embodiment.

FIG. 10 illustrates an AI device 1000 according to an embodiment of the present disclosure.

The AI device 1000 of FIG. 10 may correspond to the security device 100 of FIG. 1, and some of constituent elements of FIG. 10, which are not included in the security device 100 of FIG. 1 or the security device 600 of FIG. 6, may be selectively adopted within a range in which the embodiments of the present disclosure may be realized.

The AI device 1000 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 10, the AI device 1000 may include a communication unit 1010, an input unit 1020, a learning processor 1030, a sensing unit 1040, an output unit 1050, a memory 1070, and a processor 1080.

The communication unit 1010 may transmit and receive data to and from external devices, such as other AI devices 1100a to 1100e and an AI server 1100, using wired/wireless communication technologies. For example, the communication unit 1010 may transmit and receive sensor information, user input, learning models, and control signals, for example, to and from external devices.

At this time, the communication technology used by the communication unit 1010 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

The input unit 1020 may acquire various types of data.

At this time, the input unit 1020 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

The input unit 1020 may acquire, for example, input data to be used when acquiring an output using learning data for model learning and a learning model. The input unit 1020 may acquire unprocessed input data, and in this case, the processor 1080 or the learning processor 1030 may extract an input feature as pre-processing for the input data.

The learning processor 1030 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, the learning processor 1030 may perform AI processing along with the learning processor 1030 of the AI device 1000.

At this time, the learning processor 1030 may include a memory integrated or embodied in the AI device 1000. Alternatively, the learning processor 1030 may be realized using the memory 1070, an external memory directly coupled to the AI device 1000, or a memory held in an external device.

The sensing unit 1040 may acquire at least one of internal information of the AI device 1000, environmental information around the AI device 1000, and user information using various sensors.

At this time, the sensors included in the sensing unit 1040 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and a temperature sensor, for example.

The output unit 1050 may generate, for example, a visual output, an auditory output, or a tactile output.

At this time, the output unit 1050 may include, for example, a display that outputs visual information, a speaker that outputs auditory information, and a haptic module that outputs tactile information.

The memory 1070 may store data which assists various functions of the AI device 1000. For example, the memory 1070 may store input data acquired by the input unit 1020, learning data, learning models, and learning history, for example.

The processor 1080 may determine at least one executable operation of the AI device 1000 based on information determined or generated using a data analysis algorithm or a machine learning algorithm. Then, the processor 1080 may control constituent elements of the AI device 1000 to perform the determined operation.

To this end, the processor 1080 may request, search, receive, or utilize data of the learning processor 1030 or the memory 1070, and may control the constituent elements of the AI device 1000 so as to execute a predictable operation or an operation that is deemed desirable among the at least one executable operation.

At this time, when connection of an external device is required to perform the determined operation, the processor 1080 may generate a control signal for controlling the external device and may transmit the generated control signal to the external device.

The processor 1080 may acquire intention information with respect to user input and may determine a user request based on the acquired intention information.

At this time, the processor 1080 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by the learning processor 1030, may have learned by a learning processor 1140 of an AI server 1100, or may have learned by distributed processing of these processors.

The processor 1080 may collect history information including, for example, the content of an operation of the AI device 1000 or feedback of the user with respect to an operation, and may store the collected information in the memory 1070 or the learning processor 1030, or may transmit the collected information to an external device such as the AI server 1100. The collected history information may be used to update a learning model.

The processor 1080 may control at least some of the constituent elements of the AI device 1000 in order to drive an application program stored in the memory 1070. Moreover, the processor 1080 may combine and operate two or more of the constituent elements of the AI device 1000 for the driving of the application program.

Figure 11:
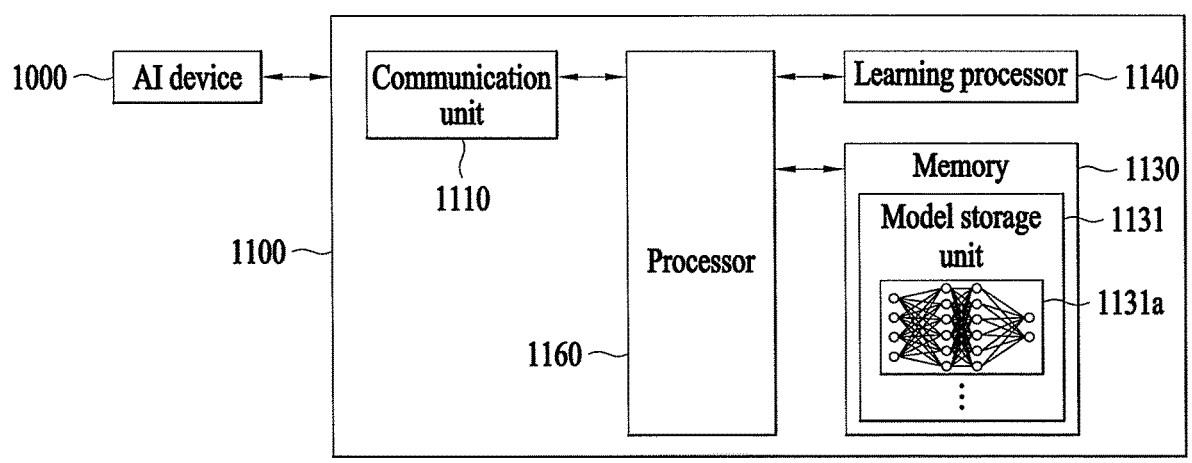
FIG. 11 illustrates an AI server according to an example embodiment.

FIG. 11 illustrates an AI server 1100 according to an embodiment of the present disclosure.

Referring to FIG. 11, the AI server 1100 may refer to a device that causes an artificial neural network to learn using a machine learning algorithm or uses the learned artificial neural network. Here, the AI server 1100 may be constituted of multiple servers to perform distributed processing, and may be defined as a 5G network. At this time, the AI server 1100 may be included as a constituent element of the AI device 1000 so as to perform at least a part of AI processing together with the AI device.

The AI server 1100 may include a communication unit 1110, a memory 1130, a learning processor 1140, and a processor 1160.

The communication unit 1110 may transmit and receive data to and from an external device such as the AI device 1000.

The memory 1130 may include a model storage unit 1131. The model storage unit 1131 may store a model (or an artificial neural network 1131a) which is learning or has learned via the learning processor 1140.

The learning processor 1140 may cause the artificial neural network 1131a to learn learning data. A learning model may be used in the state of being mounted in the AI server 1100 of the artificial neural network, or may be used in the state of being mounted in an external device such as the AI device 1000.

The learning model may be realized in hardware, software, or a combination of hardware and software. In the case in which a part or the entirety of the learning model is realized in software, one or more instructions constituting the learning model may be stored in the memory 1130.

The processor 1160 may deduce a result value for newly input data using the learning model, and may generate a response or a control instruction based on the deduced result value.

Figure 12:
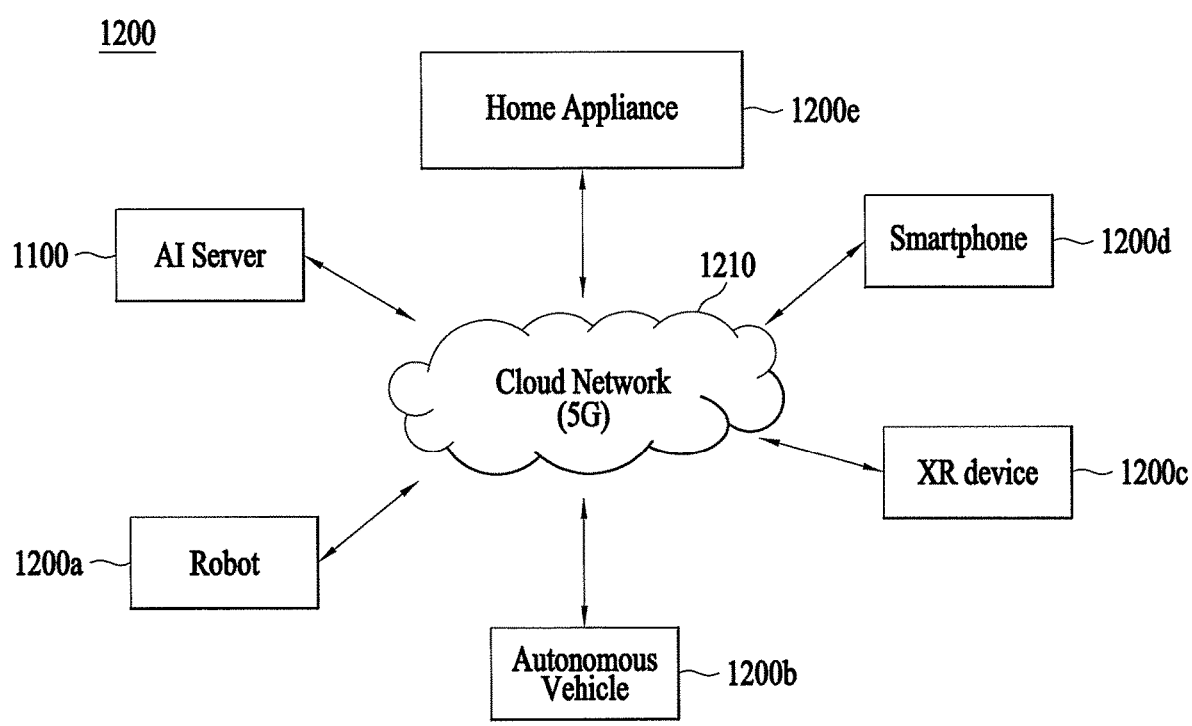
FIG. 12 illustrates an AI system according to an example embodiment.

FIG. 12 illustrates an AI system 1200 according to an embodiment of the present disclosure.

Referring to FIG. 12, in the AI system 1200, at least one of the AI server 1100, a robot 1200a, an autonomous vehicle 1200b, an XR device 1200c, a smart phone 1200d, and a home appliance 1200e is connected to a cloud network 1210. Here, the robot 1200a, the autonomous vehicle 1200b, the XR device 1200c, the smart phone 1200d, and the home appliance 1200e, to which AI technologies are applied, may be referred to as AI devices 1200a to 1200e.

The cloud network 1210 may constitute a part of a cloud computing infra-structure, or may refer to a network present in the cloud computing infra-structure. Here, the cloud network 1210 may be configured using a 3G network, a 4G or long term evolution (LTE) network, or a 5G network, for example.

That is, respective devices 1200a to 1200e and 1100 constituting the AI system 1200 may be connected to each other via the cloud network 1210. In particular, respective devices 1200a to 1200e and 1100 may communicate with each other via a base station, or may perform direct communication without the base station.

The AI server 1100 may include a server which performs AI processing and a server which performs an operation with respect to big data.

The AI server 1100 may be connected to at least one of the robot 1200a, the autonomous vehicle 1200b, the XR device 1200c, the smart phone 1200d, and the home appliance 1200e, which are AI devices constituting the AI system 1200, via cloud network 1210, and may assist at least a part of AI processing of connected the AI devices 1200a to 1200e.

At this time, instead of the AI devices 1200a to 1200e, the AI server 1100 may cause an artificial neural network to learn according to a machine learning algorithm, and may directly store a learning model or may transmit the learning model to the AI devices 1200a to 1200e.

At this time, the AI server 1100 may receive input data from the AI devices 1200a to 1200e, may deduce a result value for the received input data using the learning model, and may generate a response or a control instruction based on the deduced result value to transmit the response or the control instruction to the AI devices 1200a to 1200e.

Alternatively, the AI devices 1200a to 1200e may directly deduce a result value with respect to input data using the learning model, and may generate a response or a control instruction based on the deduced result value.

Hereinafter, various embodiments of the AI devices 1200a to 1200e, to which the above-described technology is applied, will be described. Here, the AI devices 1200a to 1200e illustrated in FIG. 12 may be specific embodiments of the AI device 1000 illustrated in FIG. 10.

The robot 1200a may be realized into a guide robot, a transportation robot, a cleaning robot, a wearable robot, an entertainment robot, a pet robot, or an unmanned flying robot, for example, through the application of AI technologies.

The robot 1200a may include a robot control module for controlling an operation, and the robot control module may refer to a software module or a chip realized in hardware.

The robot 1200a may acquire information on the state of the robot 1200a using sensor information acquired from various types of sensors, may detect (recognize) the surrounding environment and an object, may generate map data, may determine a movement route and a driving plan, may determine a response with respect to user intersection, or may determine an operation.

Here, the robot 1200a may use sensor information acquired from at least one sensor among a lidar, a radar, and a camera in order to determine a movement route and a driving plan.

The robot 1200a may perform the above-described operations using a learning model configured with at least one artificial neural network. For example, the robot 1200a may recognize the surrounding environment and the object using the learning model, and may determine an operation using the recognized surrounding environment information or object information. Here, the learning model may be directly learned in the robot 1200a, or may be learned in an external device such as the AI server 1100.

At this time, the robot 1200a may directly generate a result using the learning model to perform an operation, but may transmit sensor information to an external device such as the AI server 1100 and receive a result generated by the external device to perform an operation.

The robot 1200a may determine a movement route and a driving plan using at least one of map data, object information detected from sensor information, and object information acquired from an external device, and a drive unit may be controlled to drive the robot 1200a according to the determined movement route and driving plan.

The map data may include object identification information for various objects arranged in a space along which the robot 1200a moves. For example, the map data may include object identification information for stationary objects, such as the wall and the door, and movable objects such as a flowerpot and a desk. Then, the object identification information may include names, types, distances, and locations, for example.

In addition, the robot 1200a may perform an operation or may drive by controlling the drive unit based on user control or interaction. At this time, the robot 1200a may acquire interactional intention information depending on a user operation or voice expression, and may determine a response based on the acquired intention information to perform an operation.

The autonomous vehicle 1200b may be realized into a mobile robot, a vehicle, or an unmanned air vehicle, for example, through the application of AI technologies.

The autonomous vehicle 1200b may include an autonomous driving control module for controlling an autonomous driving function, and the autonomous driving control module may mean a software module or a chip realized in hardware. The autonomous driving control module may be a constituent element included in the autonomous vehicle 1200b, but may be a separate hardware element outside the autonomous vehicle 1200b so as to be connected thereto.

The autonomous vehicle 1200b may acquire information on the state of the autonomous vehicle 1200b using sensor information acquired from various types of sensors, may detect (recognize) the surrounding environment and an object, may generate map data, may determine a movement route and a driving plan, or may determine an operation.

Here, the autonomous vehicle 1200b may use sensor information acquired from at least one sensor among a lidar, a radar, and a camera in the same manner as the robot 1200a in order to determine a movement route and a driving plan.

In particular, the autonomous vehicle 1200b may recognize the environment or an object with respect to an area outside the field of vision or an area located at a predetermined distance or more by receiving sensor information from external devices, or may directly receive recognized information from external devices.

The autonomous vehicle 1200b may perform the above-described operations using a learning model configured with at least one artificial neural network. For example, the autonomous vehicle 1200b may recognize the surrounding environment and the object using the learning model, and may determine a driving line using the recognized surrounding environment information or object information. Here, the learning model may be directly learned in the autonomous vehicle 1200b, or may be learned in an external device such as the AI server 1100.

At this time, the autonomous vehicle 1200*b* may generate a result using the learning model to perform an operation, but may transmit sensor information to an external device such as the AI server 1100 and receive a result generated by the external device to perform an operation.

The autonomous vehicle 1200*b* may determine a movement route and a driving plan using at least one of map data, object information detected from sensor information, and object information acquired from an external device, and a drive unit may be controlled to drive the autonomous vehicle 1200*b* according to the determined movement route and driving plan.

The map data may include object identification information for various objects arranged in a space (e.g., a road) along which the autonomous vehicle 1200*b* drives. For example, the map data may include object identification information for stationary objects, such as streetlights, rocks, and buildings, and movable objects such as vehicles and pedestrians. Then, the object identification information may include names, types, distances, and locations, for example.

In addition, the autonomous vehicle 1200*b* may perform an operation or may drive by controlling the drive unit based on user control or interaction. At this time, the autonomous vehicle 1200*b* may acquire interactional intention information depending on a user operation or voice expression, and may determine a response based on the acquired intention information to perform an operation.

The XR device 1200*c* may be realized into a head-mount display (HMD), a head-up display (HUD) provided in a vehicle, a television, a cellular phone, a smart phone, a computer, a wearable device, a home appliance, a digital signage, a vehicle, a stationary robot, or a mobile robot, for example, through the application of AI technologies.

The XR device 1200*c* may obtain information on the surrounding space or a real object by analyzing three-dimensional point cloud data or image data acquired from various sensors or an external device to generate positional data and attribute data for three-dimensional points, and may output an XR object by rendering the XR object to be output. For example, XR device 1100*c* may output an XR object including additional information about a recognized object so as to correspond to the recognized object.

The XR device 1200*c* may perform the above-described operations using a learning model configured with at least one artificial neural network. For example, XR device 1100*c* may recognize a real object from three-dimensional point cloud data or image data using a learning model, and may provide information corresponding to the recognized real object. Here, the learning model may be directly learned in the XR device 1200*c*, or may be learned in an external device such as the AI server 1100.

At this time, the XR device 1200*c* may directly generate a result using the learning model to perform an operation, but may transmit sensor information to an external device such as the AI server 1100 and receive the generated result to perform an operation.

The robot 1200*a* may be realized into a guide robot, a transportation robot, a cleaning robot, a wearable robot, an entertainment robot, a pet robot, or an unmanned flying robot, for example, through the application of AI technologies and autonomous driving technologies.

The robot 1200*a* to which the AI technologies and the autonomous driving technologies are applied may refer to, for example, a robot having an autonomous driving function, or may refer to the robot 1200*a* which interacts with the autonomous vehicle 1200*b*.

The robot 1200*a* having an autonomous driving function may collectively refer to devices that move by themselves along a given moving line without user control, or move by determining a moving line by themselves.

The robot 1200*a* and the autonomous vehicle 1200*b*, which have an autonomous driving function, may use a common sensing method in order to determine at least one of a movement route or a driving plan. For example, the robot 1200*a* and the autonomous vehicle 1200*b*, which have an autonomous driving function, may determine at least one of the movement route or the driving plan using information sensed by a lidar, a radar, and a camera.

The robot 1200*a*, which interacts with the autonomous vehicle 1200*b*, may be provided separately from the autonomous vehicle 1200*b* so as to be connected to the autonomous driving function of the autonomous vehicle 1200*b* inside or outside the autonomous vehicle 1200*b*, or may perform an operation associated with a user who has got on the autonomous vehicle 1200*b*.

At this time, the robot 1200*a*, which interacts with the autonomous vehicle 1200*b*, may acquire sensor information instead of the autonomous vehicle 1200*b* to provide the information to the autonomous vehicle 1200*b*, or may acquire sensor information and generate surrounding environment information or object information to provide the information to the autonomous vehicle 1200*b*, thereby controlling or assisting the autonomous driving function of the autonomous vehicle 1200*b*.

Alternatively, the robot 1200*a*, which interacts with the autonomous vehicle 1200*b*, may monitor the user who has got on the autonomous vehicle 1200*b* or may control the functions of the autonomous vehicle 1200*b* via interaction with the user. For example, when it is determined that a driver is in a drowsy state, the robot 1200*a* may activate the autonomous driving function of the autonomous vehicle 1200*b* or may assist the control of a drive unit of the autonomous vehicle 1200*b*. Here, the functions of the autonomous vehicle 1200*b* controlled by the robot 1200*a* may include not only the autonomous driving function, but also a function provided in a navigation system or an audio system provided in the autonomous vehicle 1200*b*.

Alternatively, the robot 1200*a*, which interacts with the autonomous vehicle 1200*b*, may provide information to the autonomous vehicle 1200*b* or assist the function thereof at the outside of the autonomous vehicle 1200*b*. For example, the robot 1200*a* may serve as a smart traffic light that provides traffic information including, for example, traffic signal information to the autonomous vehicle 1200*b*, or may serve as an automatic electric charging unit of an electric vehicle that may interact with the autonomous vehicle 1200*b* and may be automatically connected to a charge port of the vehicle.

The robot 1200*a* may be realized into a guide robot, a transportation robot, a cleaning robot, a wearable robot, an entertainment robot, a pet robot, an unmanned flying robot, or a drone, for example, through the application of AI technologies and XR technologies.

The robot 1200*a*, to which the XR technologies are applied, may refer to a robot which is a control or interaction target in an XR image. In this case, the robot 1200*a* may be provided separately from the XR device 1200*c* and may operate in cooperation with the XR device 1200*c*.

When the robot 1200*a*, which is a control or interaction target in an XR image, acquires sensor information from sensors including a camera, the robot 1200*a* or the XR device 1200*c* may generate an XR image based on the sensor information, and the XR device 1200*c* may output the generated XR image. Then, the robot 1200*a* may operate based on a control signal input through the XR device 1200*c* or via intersection with the user.

For example, the user may check the XR image corresponding to the viewpoint of the robot 1200*a*, which is remotely linked, via an external device such as the XR device 1200*c*, and may adjust an autonomous driving route of the robot 1200*a* or control an operation or driving thereof via interaction with the robot, or may check information on an object around thereof.

The autonomous vehicle 1200*b* may be realized into a mobile robot, a vehicle, or an unmanned air vehicle, for example, through the application of the AI technologies and the XR technologies.

The autonomous vehicle 1200*b*, to which the XR technologies are applied, may refer to an autonomous vehicle having an XR image providing device, or may refer to an autonomous vehicle as a control or interaction target in an XR image, for example. Particularly, the autonomous vehicle 1200*b* as a control or interaction target in an XR image may be provided separately from the XR device 1200*c* and may operate in cooperation with the XR device 1200*c*.

The autonomous vehicle 1200*b* having the XR image providing device may acquire sensor information from sensors including a camera, and may output an XR image generated based on the acquired sensor information. For example, the autonomous vehicle 1200*b* may include an HUD to output an XR image, thereby providing an occupant with an XR object corresponding to a real object or an object in the screen.

At this time, when the XR object is output to the HUD, at least a portion of the XR object may be output so as to overlap with a real object to which the passenger's gaze is directed. On the other hand, when the XR object is output to a display provided in the autonomous vehicle 1200*b*, at least a portion of the XR object may be output so as to overlap with an object in the screen. For example, the autonomous vehicle 1200*b* may output XR objects corresponding to objects such as a lane, another vehicle, a traffic light, a traffic sign, a two-wheeled vehicle, a pedestrian, and a building.

When the autonomous vehicle 1200*b* as a control or interaction target in an XR image acquires sensor information from sensors including a camera, the autonomous vehicle 1200*b* or the XR device 1200*c* may generate an XR image based on the sensor information, and the XR device 1200*c* may output the generated XR image. Then, the autonomous vehicle 1200*b* may operate based on a control signal input through an external device such as the XR device 1200*c* or via interaction with the user.

Figure 13:
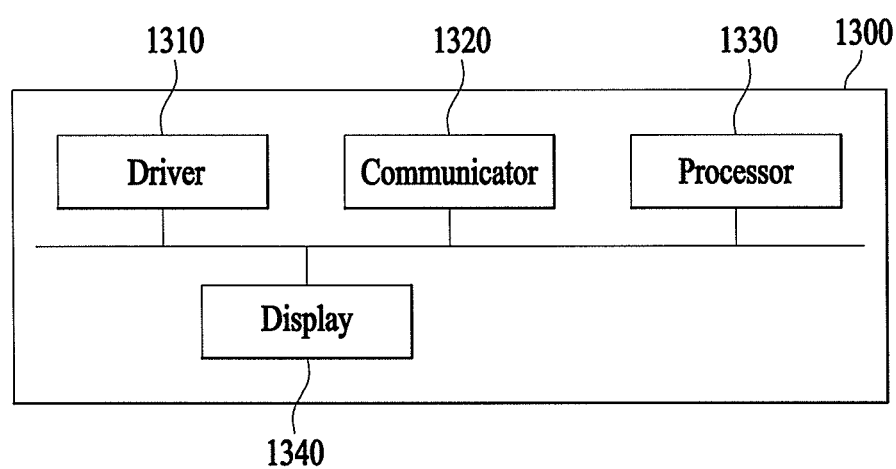
FIG. 13 is a block diagram illustrating a robot for releasing security of a security device based on spatial information according to an example embodiment.

FIG. 13 is a block diagram illustrating a robot 1300 for releasing security of the security device 100 based on spatial information according to an example embodiment.

The robot 1300 may include a configuration of performing an operation suitable for the security releasing method of the security device 100. The robot 1300 may include a driver 1310 that provides a driving force for a predetermined motion to the robot 1300, a communicator 1310 that communicates with an external device (for example, the security device 100, the security system 950, and other various types of electronic devices), and a processor 1330 that acquires first release information including at least one of security release information and the spatial information through the communicator 1320 and controls the driver 1310 such that the robot 1300 performs movement and a security releasing operation based on the first release information. The robot 1300 may further include a display 1340 to display a variety of information. The display 1340 may display various types of information corresponding to the security release information included in the first release information. The processor 1330 may control at least one of the driver 1310 and the display 1340 based on the first release information. Based on the security releasing operation of the robot 1300 implemented according to this, the security of the security device 100 may be released.

The robot 1300 may be authenticated by the security device 100 or the security system 950 based on a predetermined method. The authenticated robot 1300 may receive the first release information through the communicator 1320 and perform the security releasing operation based on the first release information, thereby releasing the security of the security device 100.

Identification information for identifying the robot 1300, for example, a QR code, a barcode, and a serial number may be marked or attached to the robot 1300 in association with the robot 1300. The security device 100 may capture or recognize the identification information to determine that the robot 1300 is an authenticated robot.

The security system 950 interworking with the security device 100 may determine that the robot 1300 is the authenticated robot based on an authentication request received from an external source. The security device 100 may verify that the robot 1300 is the robot authenticated by the security system 950 by capturing or recognizing the identification information attached to the robot 1300, so that the robot 1300 acquires the first release information.

The first release information acquired by the authenticated robot 1300 may correspond to second release information for releasing the security of the security device 100.

The above-described method according to the present disclosure may be provided as a program to be executed in a computer and may be recorded on a computer readable recording medium.

The method according to the present disclosure may be executed via software. When executed via software, the constituent elements of the present disclosure are code segments that execute required operations. The program or the code segments may be stored in a processor readable medium.

The computer readable recording medium includes all kinds of recording devices in which data is stored in a computer readable manner. Examples of the computer readable recording device include a ROM, a RAM, a CD-ROM, a DVD-ROM, a DVD-RAM, a magnetic tape, a floppy disc, a hard disc, and an optical data storage device. In addition, the computer readable recording medium may be distributed in a computer device connected thereto via a network so that a computer readable code may be stored and executed in a distribution manner.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of releasing security of a security device, using spatial information associated with a robot, the method comprising:

capturing an image of the robot using a camera of the security device;

acquiring first release information including security release information and the spatial information based on the captured image of the robot;

comparing the first release information to predetermined second release information; and determining to release the security when the security release information and the spatial information of the first release information matches security release information and spatial information of the second release information, respectively, wherein the spatial information includes position information and depth information regarding the robot which represents the security release information in the captured image.

2. The method of claim 1, wherein the acquiring of the first release information comprises:

acquiring the spatial information based on at least one of a position of the robot and a captured size of the robot in the image obtained using the camera.

3. The method of claim 1, wherein the capturing of the image of the robot comprises capturing the image of the robot to acquire depth information, and the acquiring of the first release information comprises acquiring the spatial information based on the acquired depth information.

4. The method of claim 1, further comprising:

determining whether the robot is an authenticated robot; and transmitting, when the robot is determined to be the authenticated robot, one-time release information to the robot, wherein the determining to release the security comprises:
determining to release the security when the first release information acquired by capturing the robot performing a security releasing operation based on the one-time release information matches the second release information.

5. The method of claim 1, wherein the security release information includes at least one of a password, a pin code, a gesture, a moving direction, and a stop-time after movement, and wherein the spatial information is information associated with a plurality of positions at which the robot performs operations representing the security release information.

6. The method of claim 1, wherein the comparing of the first release information to the second release information comprises:

determining whether information on a position of the robot indicated by the spatial information matches corresponding spatial information included in the second release information; and determining whether security release information acquired at a position corresponding to the spatial information included in the first release information matches corresponding security release information included in the second release information.

7. The method of claim 1, wherein the spatial information is obtained by processing spatial information acquired from the image based on size information of the robot.

8. A security device for releasing security using spatial information associated with a robot, the device comprising:

a camera configured to capture an image of the robot; and a processor configured to acquire first release information including security release information and the spatial information based on the captured image of the robot, compare the first release information to predetermined second release information, and determine to release the security when the security release information and the spatial information of the first release information matches security release information and spatial information of the second release information, respectively, wherein the spatial information a includes position information and depth information regarding the robot which represents the security release information in the captured image.

9. The security device of claim 8, wherein the processor is configured to acquire the spatial information based on at least one of a position of the robot and a captured size of the robot in the image obtained using the camera.

10. The security device of claim 8, wherein the camera comprises a depth information acquirer configured to acquire depth information, and wherein the processor is configured to acquire the spatial information based on the depth information acquired from the depth information acquirer.

11. The security device of claim 8, further comprising:

a communicator configured to communicate with an external device, wherein the processor is further configured to determine whether the robot is an authenticated robot and control the communicator to transmit one-time release information to the robot when the robot is determined to be the authenticated robot, and wherein the processor is configured to determine to release the security when the first release information acquired by capturing the robot performing a security releasing operation based on the one-time release information matches the second release information.

12. The security device of claim 8, wherein the security release information includes at least one of a password, a pin code, a gesture, a moving direction, and a stop-time after movement, and wherein the spatial information is information associated with a plurality of positions at which the robot performs operations representing the security release information.

13. The security device of claim 8, wherein the processor is configured to determine whether information on a position of the robot indicated by the spatial information matches corresponding spatial information included in the second release information and determine whether security release information acquired at a position corresponding to the spatial information included in the first release information matches corresponding security release information included in the second release information.

14. The security device of claim 8, wherein the spatial information is obtained by processing spatial information acquired from the image based on size information of the robot.

15. A non-transitory computer readable recording medium comprising a computer program that when executed by a computer, cause the computer to perform a method of releasing security of a security device, using spatial information associated with a robot, the method comprising:

capturing an image of the robot using a camera of the security device;

acquiring first release information including security release information and the spatial information based on the captured image of the robot;

comparing the first release information to predetermined second release information; and determining to release the security when the security release information and the spatial information of the first release information matches security release information and spatial information of the second release information, respectively, wherein the spatial information a includes position information and depth information regarding the robot which represents the security release information in the captured image.

16. A robot for releasing security of a security device using spatial information, the robot comprising:
- a driver configured to provide a driving force for a predetermined motion to the robot;
- a communicator configured to communicate with an external device; and
- a processor configured to, when first release information including security release information and the spatial information are acquired through the communicator, control the driver such that the robot performs movement based on the spatial information and a security releasing operation based on the first release information, wherein the spatial information includes position information and depth information regarding the robot which represents the security release information.

17. The robot of claim 16, wherein the communicator is configured to acquire the first release information when the robot is authenticated by the security device.

18. The robot of claim 17, wherein the security device authenticates the robot by capturing identification information including at least one of a quick response (QR) code, a barcode, and a serial number associated with the robot.

19. The robot of claim 17, wherein the robot is authenticated by a security system interworking with the security device based on an authentication request received from an external source.

20. The robot of claim 16, further comprising:
- a display, wherein the processor is configured to control at least one of the driver and the display based on the first release information, wherein the security release information includes at least one of a password, a pin code, a gesture, a moving direction, and a stop-time after movement, and wherein the spatial information is information associated with a plurality of positions at which the robot performs operations representing the security release information.

* * * * *